US009353858B2

(12) United States Patent
Kinoshita

(10) Patent No.: US 9,353,858 B2
(45) Date of Patent: May 31, 2016

(54) ABNORMALITY DETECTION DEVICE FOR CONTINUOUSLY VARIABLE TRANSMISSION AND METHOD OF DETECTING ABNORMALITY OF THE CONTINUOUSLY VARIABLE TRANSMISSION

(71) Applicant: Fuji Jukogyo Kabushiki Kaisha, Tokyo (JP)

(72) Inventor: Takahiro Kinoshita, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/611,989

(22) Filed: Feb. 2, 2015

(65) Prior Publication Data

US 2015/0233472 A1 Aug. 20, 2015

(30) Foreign Application Priority Data

Feb. 14, 2014 (JP) ................................. 2014-026184

(51) Int. Cl.
| | |
|---|---|
| *G06F 7/00* | (2006.01) |
| *F16H 61/12* | (2010.01) |
| *B60W 10/101* | (2012.01) |
| *B60W 10/18* | (2012.01) |
| *B60W 30/19* | (2012.01) |
| *B60W 50/14* | (2012.01) |
| *F16H 61/66* | (2006.01) |

(Continued)

(52) U.S. Cl.
CPC ............. *F16H 61/12* (2013.01); *B60W 10/101* (2013.01); *B60W 10/18* (2013.01); *B60W 30/19* (2013.01); *B60W 50/14* (2013.01); *F16H 61/66* (2013.01); *F16H 61/662* (2013.01); *F16H 61/16* (2013.01); *F16H 2061/1268* (2013.01); *F16H 2061/6608* (2013.01)

(58) Field of Classification Search
CPC ....... F16H 61/12; F16H 61/662; F16H 61/66; F16H 2061/6608; F16H 2061/1268; F16H 61/16; B60W 10/101; B60W 10/18; B60W 50/14; B60W 30/19
See application file for complete search history.

(56) References Cited

U.S. PATENT DOCUMENTS 4,735,113 A * 4/1988 Yamamuro ............. F16H 45/02
477/38
5,067,372 A * 11/1991 Suzuki .................. F16H 61/143
192/3.3

(Continued)

FOREIGN PATENT DOCUMENTS

JP 2013-024327 A 2/2013

*Primary Examiner* — David J Hlavka
(74) *Attorney, Agent, or Firm* — McGinn IP Law Group PLLC

(57) ABSTRACT

An abnormality detection device for a continuously variable transmission includes: an acquisition module that acquires a control variable for controlling an operation of a forward and reverse switching mechanism that is provided between an engine and a driving wheel to switch between forward rotation and reverse rotation of the driving wheel; and a determination module that determines the control variable for the forward and reverse switching mechanism to be abnormal in the case where a traveling range is selected by the selection unit, a vehicle speed detected by the vehicle speed detection unit is higher than or equal to a predetermined speed, and the control variable for the forward and reverse switching mechanism, acquired by the acquisition module has a value that does not allow a driving force of the engine to be transmitted.

19 Claims, 2 Drawing Sheets

(51) Int. Cl.
*F16H 61/662* (2006.01)
*F16H 61/16* (2006.01)

(56) References Cited

U.S. PATENT DOCUMENTS

| | | | | |
|---|---|---|---|---|
| 5,067,603 A * | 11/1991 | Kato | ................... | F16D 48/066 192/3.31 |
| 6,358,179 B1 * | 3/2002 | Sakai | ................... | B60W 10/02 475/216 |
| 2010/0248894 A1 * | 9/2010 | Jozaki | ................ | F16H 1/66259 477/44 |
| 2014/0025269 A1 * | 1/2014 | Ayabe | ................... | F16H 61/12 701/60 |
| 2014/0244123 A1 * | 8/2014 | Matsunaga | ............ | B60T 8/172 701/67 |
| 2015/0204440 A1 * | 7/2015 | Kinoshita | ............ | B60W 10/06 701/54 |
| 2015/0204441 A1 * | 7/2015 | Kinoshita | ............... | F16H 61/12 701/62 |

\* cited by examiner

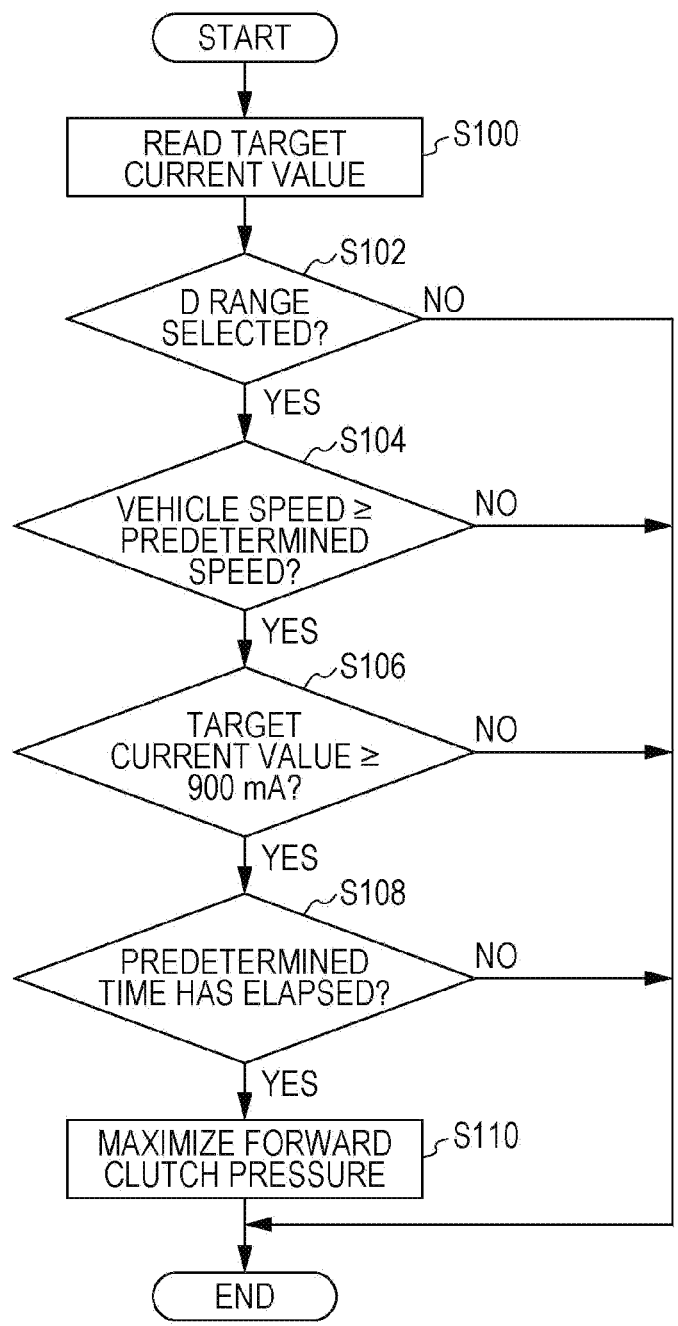

ABNORMALITY DETECTION DEVICE FOR CONTINUOUSLY VARIABLE TRANSMISSION AND METHOD OF DETECTING ABNORMALITY OF THE CONTINUOUSLY VARIABLE TRANSMISSION

CROSS-REFERENCE TO RELATED APPLICATIONS

The present application claims priority from Japanese Patent Application No. 2014-026184 filed on Feb. 14, 2014, the entire contents of which are hereby incorporated by reference.

BACKGROUND

1. Technical Field

The present disclosure relates to an abnormality detection device for a continuously variable transmission and a method of detecting abnormality of the continuously variable transmission.

2. Related Art

These days, continuously variable transmissions (CVT) such as a chain-type CVT or a belt-type CVT, which allow a gear ratio to be continuously changed, are widely in practical use. In general, such a continuously variable transmission has a forward and reverse switching mechanism for switching between forward rotation and reverse rotation of driving wheels (that is, forward motion and reverse motion of a vehicle) (see, for example, Japanese Unexamined Patent Application Publication (JP-A) No. 2013-24327).

The forward and reverse switching mechanism described in JP-A No. 2013-24327 mainly includes a double-pinion type planetary gear train, a forward clutch, and a reverse brake. The forward clutch is, for example, a multi-plate clutch and is set in an engaged state when supplied with clutch pressure. Similarly, the reverse brake is a multi-plate brake and is set in an engaged state when supplied with brake pressure. When the forward clutch is engaged and the reverse brake is released, a forward state is assumed in which rotation of the engine is directly transmitted to a primary pulley. On the other hand, when the forward clutch is released and the reverse brake is engaged, a reverse state is assumed in which rotation of the engine is reversed by a planetary gear train and is transmitted to the primary pulley.

In general, a continuously variable transmission including a forward and reverse switching mechanism is controlled by an electrical control device using a microcomputer, for example. Although it is extremely rare for such an electrical control device to have a failure, a fault might occur in the microcomputer, for example, a fault in a memory such as a RAM and a register (for example, written data and read data do not match), a fault in a logical operation circuit, and variation in clock signal might occur. In addition, an error in setting or writing ROM data (such as control data) might occur.

In the case where such a hardware failure or an error in setting ROM data occurs, for example, abnormality of a target clutch pressure may cause abnormality of the above-mentioned clutch pressure, the target clutch pressure being a control target value of the clutch pressure. For example, in the case where the target clutch pressure has an abnormal value and the clutch pressure is reduced, the driving force of the engine is not transmitted to the driving wheels against the intention of a driver, that is, the intention of keeping the vehicle moving, and thus the driver may not be able to drive the vehicle. In the case where such an abnormal condition occurs in a vehicle on a slope as an example, the vehicle may slide down. However, for example, determination as to the above-described abnormality of a target clutch pressure, in other words, reasonableness of a control value of the forward and reverse switching mechanism has not been considered.

SUMMARY OF THE DISCLOSURE

The present disclosure has been made to solve the above-mentioned problem and provides an abnormality detection device for a continuously variable transmission and a method of detecting abnormality of the continuously variable transmission, the abnormality detection device being capable of detecting whether or not a control variable for a forward and reverse switching mechanism is an abnormal value that does not allow the driving force of the engine to be transmitted, against the intention of a driver.

An aspect of the present invention provides an abnormality detection device for a continuously variable transmission according to the present disclosure including: a selection unit that receives an operation of selecting a range of the continuously variable transmission; a vehicle speed detection unit that detects a speed of a vehicle; an acquisition module that acquires a control variable for controlling an operation of a forward and reverse switching mechanism which is provided between an engine and a driving wheel to switch between forward rotation and reverse rotation of the driving wheel; and a determination module that determines the control variable for the forward and reverse switching mechanism to be abnormal in the case where a traveling range is selected by the selection unit, a vehicle speed detected by the vehicle speed detection unit is higher than or equal to a predetermined speed, and the control variable for the forward and reverse switching mechanism, acquired by the acquisition module has a value that does not allow a driving force of the engine to be transmitted.

The acquisition module may acquire a target current value of an actuator that adjusts a clutch pressure of a clutch included in the forward and reverse switching mechanism, the target current value serving as the control variable for the forward and reverse switching mechanism. The determination module may determine the target current value to be abnormal in the case where a traveling range is selected, the vehicle speed is higher than or equal to the predetermined speed, and the target current value is a value that does not allow a driving force of the engine to be transmitted.

The acquisition module may acquire an actual current value of an actuator that adjusts a clutch pressure of a clutch included in the forward and reverse switching mechanism, the actual current value serving as the control variable for the forward and reverse switching mechanism. The determination module may determine the actual current value to be abnormal in the case where a traveling range is selected, the vehicle speed is higher than or equal to the predetermined speed, and the actual current value is a value that does not allow a driving force of the engine to be transmitted.

The determination module may determine the control variable for the forward and reverse switching mechanism to be abnormal in the case where a state, in which the control variable for the forward and reverse switching mechanism is determined to be abnormal, continues for a predetermined time or longer.

The abnormality detection device for a continuously variable transmission may further include a control module that controls a driving amount of the forward and reverse switching mechanism at a value that allows a driving force of the engine to be transmitted, in the case where the control variable for the forward and reverse switching mechanism is determined to be abnormal.

The abnormality detection device for a continuously variable transmission may further include a braking unit that brakes the vehicle; and a braking control unit that controls an operation of the braking unit, and the braking control unit automatically brakes the vehicle in the case where the control variable for the forward and reverse switching mechanism is determined to be abnormal.

The abnormality detection device for a continuously variable transmission according to the present disclosure may further include a warning unit that issues a warning to a driver in the case where the control variable for the forward and reverse switching mechanism is determined to be abnormal.

The determination module may make determination as to abnormality of the control variable for the forward and reverse switching mechanism when an accelerator is operated by a driver.

Another aspect of the present invention provides a method of detecting abnormality of a continuously variable transmission according to the present disclosure including the steps of: receiving an operation of selecting a range of the continuously variable transmission; detecting a speed of a vehicle; acquiring a control variable for controlling an operation of a forward and reverse switching mechanism which is provided between an engine and a driving wheel to switch between forward rotation and reverse rotation of the driving wheel; and determining the control variable for the forward and reverse switching mechanism to be abnormal in the case where a traveling range is selected by the selection step, a vehicle speed detected by the vehicle speed detection step is higher than or equal to a predetermined speed, and the control variable for the forward and reverse switching mechanism, acquired by the acquisition module has a value that does not allow a driving force of the engine to be transmitted.

BRIEF DESCRIPTION OF THE DRAWINGS

FIG. 2 is a flow chart illustrating the steps of abnormality detection processing performed on a target current value by the abnormality detection device for a continuously variable transmission according to the implementation, the target current value being of a forward clutch included in a forward and reverse switching mechanism.

DETAILED DESCRIPTION

Figure 1:
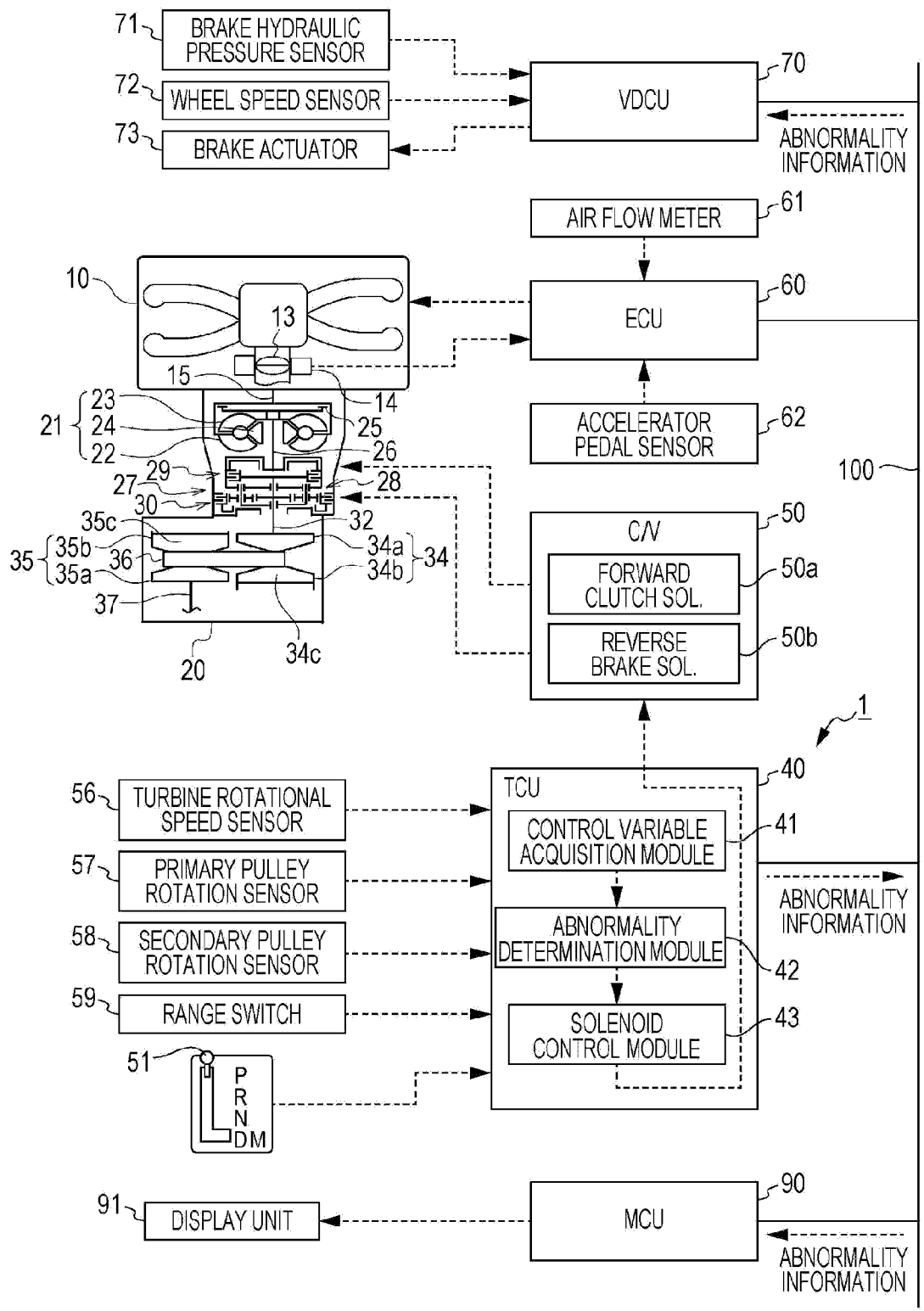
FIG. 1 is a block diagram illustrating the configuration of an abnormality detection device for a continuously variable transmission according to an implementation.

Hereinafter, a preferred implementation of the present disclosure will be described in detail with reference to the accompanying drawings. It is to be noted that the same or corresponding components in the drawings will be denoted by the same symbol. Also, the same elements in the drawings are labeled with the same symbols and a redundant description will be omitted.

First, the configuration of an abnormality detection device 1 for a continuously variable transmission according to the implementation will be described with reference to FIG. 1. FIG. 1 is a block diagram illustrating the configuration of the abnormality detection device 1 for a continuously variable transmission and a continuously variable transmission 20 to which the abnormality detection device 1 is applied.

An engine 10 may be of any type and the present implementation employs a horizontally-opposed four-cylinder direct-injection gasoline engine. In the engine 10, air sucked by an air cleaner (not illustrated) is throttled by an electronically controlled throttle valve (hereinafter referred to as a "throttle valve") 13 which is provided in an inlet pipe, and the air flows through an intake manifold and is sucked into each of the cylinders which are formed in the engine 10. Here, the amount of air sucked by the air cleaner is detected by an air flow meter 61. Furthermore, the throttle valve 13 is provided with a throttle opening sensor 14 that detects an opening of the throttle valve 13. An injector, which injects fuel, is mounted in each cylinder. In addition, a spark plug which ignites an air-fuel mixture, and an igniter built-in coil which applies a high voltage to the spark plug are mounted in each cylinder. In each cylinder of the engine 10, air-fuel mixture is ignited by the spark plug and burns, the air-fuel mixture including air sucked and fuel injected by the injector. The exhaust gas after combustion is discharged through an exhaust pipe.

In addition to the air flow meter 61 and the throttle opening sensor 14 described above, a cam angle sensor for identifying cylinders of the engine 10 is mounted in the vicinity of the camshaft of the engine 10. Furthermore, a crank angle sensor for detecting a position of a crankshaft is mounted in the vicinity of the crankshaft of the engine 10. These sensors are connected to the below-described engine control unit (hereinafter referred to as "ECU") 60. The ECU 60 is also connected to various sensors such as an accelerator pedal sensor 62 that detects depressed amount of an accelerator pedal, that is, the opening of the accelerator pedal, and a coolant temperature sensor that detects a temperature of coolant for the engine 10.

The crankshaft (output shaft) 15 of the engine 10 is connected to a continuously variable transmission 20 that converts and outputs a driving force from the engine 10 via a torque converter 21 and a forward and reverse switching mechanism 27, the torque converter 21 that has a clutch function and a torque amplifying function.

The torque converter 21 mainly includes a pump impeller 23, a turbine liner 23, and a stator 24. The pump impeller 22 connected to the crankshaft (output shaft) 15 generates a flow of oil, and the turbine liner 23, which is disposed to face the pump impeller 22, receives force from the engine 10 via oil to drive the output shaft. The stator 24 located between the pump impeller 22 and the turbine liner 23 rectifies the discharge (return) flow from the turbine liner 23 and returns the flow to the pump impeller 22, thereby generating a torque amplifying effect.

The torque converter 21 also has a lock-up clutch 25 that sets the input and output in a directly connected state. When the lock-up clutch 25 is not engaged (in a non-lock-up state), the torque converter 21 increases the torque of the drive force from the engine 10 and transmits the increased torque to the continuously variable transmission 20, whereas when the lock-up clutch 25 is engaged (in a lock-up state), the torque converter 21 directly transmits the drive force from the engine 10 to the continuously variable transmission 20. The rotational speed (turbine rotational speed) of the turbine liner 23 included in the torque converter 21 is detected by a turbine rotational speed sensor 56. The detected turbine rotational speed is outputted to the below-described transmission control unit (hereinafter referred to as "TCU") 40.

The forward and reverse switching mechanism 27 switches between forward rotation and reverse rotation (forward motion and reverse motion of the vehicle) of driving wheels. The forward and reverse switching mechanism 27 mainly includes a double pinion planetary gear train 28, a forward clutch 29, and a reverse brake 30. The forward and reverse switching mechanism 27 controls respective states of the forward clutch 29 and the reverse brake 30, thereby allowing a transmission path of the engine driving force to be switched from one to another.

More specifically, engaging the forward clutch 29 and releasing the reverse brake 30 cause the rotation of a turbine shaft 26 to be directly transmitted to the below-described primary shaft 32, and thus the vehicle may be driven forward. In addition, releasing the forward clutch 29 and engaging the reverse brake 30 cause the planetary gear train 28 to be operated, thereby allowing the rotational direction of the primary shaft 32 to be reversed, and thus the vehicle may be driven backward. It is to be noted that releasing the forward clutch 29 and the reverse brake 30 causes the turbine shaft 26 and the primary shaft 32 to be separated, and thus the forward and reverse switching mechanism 27 assumes a neutral state in which force is not transmitted to the primary shaft 32. It is to be noted that the operation of the forward clutch 29 and the reverse brake 30 is controlled by the below-described TCU 40 and valve body (control valve) 50.

The continuously variable transmission 20 has a primary shaft 32 and a secondary shaft 37 disposed parallel to the primary shaft 32, the primary shaft 32 being connected to the turbine shaft (output shaft) 26 of the torque converter 21 via the forward and reverse switching mechanism 27.

The primary shaft 32 is provided with a primary pulley 34. The primary pulley 34 has a fixed sheave 34a connected to the primary shaft 32, and a movable sheave 34b which faces the fixed sheave 34a and is attached slidably in the axial direction of the primary shaft 32. Each of the sheaves 34a and 34b is designed to have a variable cone surface pitch, that is, a variable pulley groove width. On the other hand, the secondary shaft 37 is provided with a secondary pulley 35. The secondary pulley 35 has a fixed sheave 35a connected to the secondary shaft 37, and a movable sheave 35b which faces the fixed sheave 35a and is attached slidably in the axial direction of the secondary shaft 37. The secondary pulley 35 is designed to have a variable pulley groove width.

A chain 36 for transmitting drive force is wound around the primary pulley 34 and the secondary pulley 35. The groove width of each of the primary pulley 34 and the secondary pulley 35 is changed so that a ratio (pulley ratio) of a winding radius of the chain 36 to each pulley 34, 35 is changed, thereby changing the gear ratio continuously. Here, the gear ratio i is expressed by i=Rs/Rp, where Rp is the winding radius of the chain 36 to the primary pulley 34 and Rs is the winding radius of the chain 36 to the secondary pulley 35. Therefore, the gear ratio i is determined by dividing a primary pulley rotational speed Np by a secondary pulley rotational speed Ns (i=Np/Ns).

The primary pulley 34 (movable sheave 34b) includes a hydraulic chamber 34c. On the other hand, the secondary pulley 35 (movable sheave 35b) includes a hydraulic chamber 35c. The groove width of each of the primary pulley 34 and the secondary pulley 35 is set and changed by adjusting a primary hydraulic pressure and a secondary hydraulic pressure, the primary hydraulic pressure being introduced into the hydraulic chamber 34c of the primary pulley 34, the secondary hydraulic pressure being introduced into the hydraulic chamber 35c of the secondary pulley 35.

The hydraulic pressure for shifting the continuously variable transmission 20, that is, the above-mentioned primary hydraulic pressure and secondary hydraulic pressure are controlled by a valve body (control valve) 50. The valve body 50 uses a spool valve and a solenoid valve (electromagnetic valve) for actuating the spool valve to open and close an oil passage which is formed in the valve body 50, thereby adjusting the hydraulic pressure discharged from an oil pump (not illustrated) and supplying the adjusted hydraulic pressure to the hydraulic pressure chamber 34c of the primary pulley 34 and the hydraulic pressure chamber 35c of the secondary pulley 35. In addition, the valve body 50 also supplies the hydraulic pressure to the forward and reverse switching mechanism 27 (details will be described later).

The transmission control of the continuously variable transmission 20 is performed by the TCU 40. That is, the TCU 40 controls the drive of a solenoid valve (electromagnetic valve) included in the above-described valve body 50, thereby adjusting a hydraulic pressure and changing the gear ratio of the continuously variable transmission 20, the hydraulic pressure being supplied to the hydraulic pressure chamber 34c of the primary pulley 34 and the hydraulic pressure chamber 35c of the secondary pulley 35. In addition, the TCU 40 controls the drive of a forward clutch solenoid 50a included in the above-described valve body 50, thereby adjusting the amount of automatic transmission fluid (ATF) supplied or discharged to or from the forward clutch 29 and engaging or releasing the forward clutch 29. Similarly, the TCU 40 controls the drive of a reverse brake solenoid 50b included in the valve body 50, thereby adjusting the amount of ATF supplied or discharged to or from the reverse brake 30 and engaging or releasing the reverse brake 30.

Here, the floor (center console) of the vehicle is provided with a shift lever (select lever) 51 to receive an operation by a driver for selectively switching an operating state (range) of the continuously variable transmission 20. The shift lever 51 is provided with a range switch 59 which is connected thereto to operate in coordination with the shift lever 51 and which detects a selection position of the shift lever 51. The range switch 59 is connected to the TCU 40 and the detected selection position of the shift lever 51 is read into the TCU 40. It is to be noted that in addition to the "D" range and the "M" range, the shift lever 51 allows selectable switching between parking "P" range, reverse "R" range, and neutral "N" range. That is, the shift lever (select lever) 51 functions as the selection unit described in the appended claims. It is to be noted that a switch-type selection mechanism may be used instead of the shift lever 51.

When the shift lever 51 is operated and D range (forward traveling range) is selected, the target current value of the forward clutch solenoid 50a is set to, for example, 0 (A) and ATF is supplied to the hydraulic pressure chamber of the forward clutch 29, whereas the target current value of the reverse brake solenoid 50b is set to, for example, 1 (A) and ATF is discharged from the hydraulic pressure chamber of the reverse brake 30. Therefore, the forward clutch 29 is in an engaged state and the reverse brake 30 is in a released state, and thus the vehicle may be driven forward. On the other hand, when the shift lever 51 is operated and R range (backward traveling range) is selected, the target current value of the reverse brake solenoid 50b is set to, for example, 0 (A) and ATF is supplied to the hydraulic pressure chamber of the reverse brake 30, whereas the target current value of the forward clutch solenoid 50a is set to, for example, 1 (A) and ATF is discharged from the hydraulic pressure chamber of the forward clutch 29. Therefore, the reverse brake 30 is in an engaged state and the forward clutch 29 is in a released state, and thus the vehicle may be driven backward. When the shift lever 51 is operated and N range or P range is selected, ATF is discharged from each of the hydraulic pressure chamber of the forward clutch 29 and the hydraulic pressure chamber of the reverse brake 30. Therefore, the forward clutch 29 and the reverse brake 30 are each in a released state (transmission of the engine driving force is intercepted), and the vehicle is in a neutral state.

The TCU 40 is connected to a primary pulley rotation sensor 57 that detects a rotational speed of the primary pulley 34 and a secondary pulley rotation sensor 58 (corresponding to a vehicle speed detection unit) that detects a rotational speed (corresponding to a vehicle speed) of the secondary pulley 35. The TCU 40 is also communicably connected to the ECU 60, a vehicle dynamic control unit (hereinafter referred to as "VDCU") 70, and a meter control unit (hereinafter referred to as "MCU") 90 via, for example, a controller area network (CAN) 100, the ECU 60 for comprehensively controlling the engine 10.

The TCU 40, the ECU 60 and the VDCU 70 each include a microprocessor for performing calculation, a ROM for storing programs that cause the microprocessor to execute processing, a RAM for storing various data such as results of the calculation, a backup RAM for saving the stored content with a 12V battery, and an input and output I/F.

The ECU 60 identifies each cylinder based on the output of the above-described cam angle sensor, and determines an engine speed from a change in rotational position of the crankshaft, the rotational position being detected from the output of the crank angle sensor. Also, the ECU 60 obtains various pieces of information such as a suction air amount, an accelerator pedal opening, an air-fuel ratio of air-fuel mixture, and a coolant temperature based on detection signals inputted from the above-described various sensors. The ECU 60 then controls an amount of fuel injection, an ignition timing, and various devices such as the throttle valve 13 based on these obtained various pieces of information, thereby controlling the engine 10 comprehensively.

The ECU 60 calculates an engine shaft torque (output torque) of the engine 10 based on the suction air amount detected by the air flow meter 61. In addition, the ECU 60 transmits information to the TCU 40 via the CAN 100, the information including an engine speed, an engine shaft torque, and an accelerator pedal opening.

The VDCU 70 is connected to a brake hydraulic pressure sensor 71 that detects a master cylinder pressure (brake hydraulic pressure) of a brake actuator 73. The VDCU 70 is also connected to a wheel speed sensor 72 (corresponding to a vehicle speed detection unit) that detects a rotational speed (vehicle speed) of each wheel of the vehicle. The VDCU 70 drives a brake actuator to brake the vehicle according to an amount of operation of a brake pedal, detects a vehicle behavior by various sensors (for example, the wheel speed sensor 72, a steering angle sensor, an acceleration sensor, and a yaw rate sensor), and reduces skidding by brake control using automatic pressurization and torque control of the engine 10, thereby assuring the stability of the vehicle when the vehicle turns. In addition, the VDCU 70 transmits braking information (brake operation information) such as the detected brake hydraulic pressure and wheel speed (vehicle speed) to the TCU 40 via the CAN 100.

On the other hand, the VDCU 70 receives information including failure information (details will be described later) from the TCU 40 via the CAN 100, the failure information indicating whether or not the target current value of the forward clutch solenoid 50a is abnormal. In the case where the target current value of the forward clutch solenoid 50a is determined to be abnormal, the VDCU 70 automatically drives the brake actuator 73 to brake the vehicle. That is, the brake actuator 73 corresponds to the braking unit described in the appended claims, and the VDCU 70 functions as the braking control unit described in the appended claims.

The TCU 40 continuously changes the gear ratio automatically according to an operational state (for example, the accelerator pedal opening and the vehicle speed) of the vehicle based on a transmission map. It is to be noted that a transmission map corresponding to the automatic transmission mode is stored in the ROM within the TCU 40.

In particular, the TCU 40 has a function of detecting abnormality (determining the reasonableness) of the target current value of the forward clutch solenoid 50a that adjusts the clutch pressure of the forward clutch 29 included in the forward and reverse switching mechanism 27. Thus, the TCU 40 functionally includes a control variable acquisition module 41, an abnormality determination module 42, and a solenoid control module 43. In the TCU 40, programs stored in the ROM are executed by a microprocessor, thereby achieving each of the functions of the control variable acquisition module 41, the abnormality determination module 42, and the solenoid control module 43. The TCU 40 also has a current detection circuit for detecting a current (value of the actual current) that flows through the forward clutch solenoid 50a and the reverse brake solenoid 50b.

The control variable acquisition module 41 acquires a control variable for controlling the operation of the forward and reverse switching mechanism 27. That is, the control variable acquisition module 41 functions as the acquisition module described in the appended claims. More specifically, the control variable acquisition module 41 acquires a target current value (corresponding to a target clutch pressure) of the forward clutch solenoid 50a (corresponding to the actuator described in the appended claims) that adjusts the clutch pressure of the forward clutch 29 included in the forward and reverse switching mechanism 27, the target current value serving as the control variable for the forward and reverse switching mechanism 27. It is to be noted that the target current value of the forward clutch solenoid 50a, acquired by the control variable acquisition module 41 is outputted to the abnormality determination module 42.

The abnormality determination module 42 determines the target current value of the forward clutch solenoid 50a to be abnormal in the case where D range (forward travelling range) is selected by the shift lever 51, a vehicle speed detected by the secondary pulley rotation sensor 58, for example, is higher than or equal to a predetermined speed (for example, 5 km/h), and the target current value is such a value (for example, 900 mA or greater) that does not allow the driving force of the engine 10 to be transmitted. That is, the abnormality determination module 42 functions as the determination module described in the appended claims. It is to be noted that the abnormality determination module 42 may make determination as to abnormality of the forward clutch solenoid 50a only when the accelerator pedal is depressed by a driver (when the accelerator is operated).

The abnormality determination module 42 determines the target current value of the forward clutch solenoid 50a to be abnormal in the case where a state, in which the target current value is determined to be abnormal, continues for a predetermined time (for example, 1 sec.) or longer. It is to be noted that a result of the determination made by the abnormality determination module 42 is outputted to the solenoid control module 43, the VDCU 70, and the MCU 90.

In regular times (normal times), the solenoid control module 43 controls the value of a current that flows through the forward clutch solenoid 50a based on the target current value of the forward clutch solenoid 50a so as to match the target current value to the actual current value.

On the other hand, in the case where the target current value of the forward clutch solenoid 50a is determined to be abnormal, the solenoid control module 43 controls the target current value at a value (for example, 0 mA) that allows the driving force of the engine 10 to be transmitted. It is to be noted that instead of rewriting the target current value in a software-controlled manner, a configuration may be adopted in which energization to the forward clutch solenoid 50a is stopped in a hardware-controlled manner.

The MCU 90 is connected to a display unit 91 having a LCD display disposed in a meter or on an upper portion of a dashboard, for example, and provides to a driver the conditions and various types of information of the vehicle, the engine 10, and the continuously variable transmission 20 for example, by driving the display unit 91. In particular, the MCU 90 issues a warning to a driver in the case where the target current value of the forward clutch solenoid 50a is determined to be abnormal. In this process, the MCU 90 preferably drives the display unit 91 to turn on a warning light, for example, or display a string such as "Please step on the brake". Simultaneously with this, a warning sound may be outputted. The MCU 90 and the display unit 91 each function as the warning unit described in the appended claims.

Next, the operation of the abnormality detection device 1 for a continuously variable transmission will be described with reference to FIG. 2. FIG. 2 is a flow chart illustrating the steps of abnormality detection (reasonableness determination) processing performed on the target current of the forward clutch solenoid 50a by the abnormality detection device 1 for a continuously variable transmission. The processing is repeatedly performed by the TCU 40 for every predetermined time (for example, every 10 ms).

First, in step S100, the target current of the forward clutch solenoid 50a is read. Next, in step S102, it is determined whether or not D range (forward travelling range) is selected by the shift lever 51. When D range is selected, the processing flow proceeds to step S104. On the other hand, when D range is not selected, the flow is exited.

In step S104, it is determined whether or not the vehicle speed is higher than or equal to a predetermined speed (for example, 5 km/h). When the vehicle speed is higher than or equal to the predetermined speed, the processing flow proceeds to step S106. On the other hand, when the vehicle speed is lower than the predetermined speed, the flow is exited.

In step S106, it is determined whether or not the target current of the forward clutch solenoid 50a is greater than or equal to a predetermined value (for example, 900 mA). When the target current is greater than or equal to the predetermined value, the processing flow proceeds to step S108. On the other hand, when the target current value is less than the predetermined value, the flow is exited and normal control is performed.

In step S108, it is determined whether or not a state, in which the target current value is greater than or equal to the predetermined value (that is, abnormal state), has continued for a predetermined time (for example, 1 sec) or longer. When an abnormal state has continued for the predetermined time or longer (that is, when the current state is determined to be abnormal), the processing flow proceeds to step S110. On the other hand, when an abnormal state has not continued for the predetermined time or longer, the flow is exited and normal control is performed.

In step S110, the target current of the forward clutch solenoid 50a is set to a value (for example, 0 mA) that allows the driving force of the engine 10 to be transmitted. Thus, the forward clutch 29 is in an engaged state. It is to be noted that in step S110, instead of rewriting the target current value, energization to the forward clutch solenoid 50a may be forcedly stopped.

As described in detail in the above, according to the present implementation, the target current value of the forward clutch solenoid 50a is determined to be abnormal in the case where D range (forward traveling range) is selected and the vehicle speed is higher than or equal to a predetermined speed (for example, 5 km/h), that is, where a driver intends to drive the vehicle and the target current value should be such a value (for example, 0 mA) that allows the driving force of the engine 10 to be transmitted, but the target current value is a value (for example, 900 mA or greater) that does not allow the driving force of the engine 10 to be transmitted. Thus, it is possible to detect whether or not the target current value of the forward clutch solenoid 50a is an abnormal value (that is, to determine the reasonableness of the target current value) that does not allow the driving force of the engine 10 to be transmitted against the intention of a driver.

According to the present implementation, the target current value of the forward clutch solenoid 50a is determined to be abnormal in the case where a state in which, the target current value is determined to be abnormal, has continued for a predetermined time (for example, 1 sec) or longer. Thus, an erroneous determination may be properly prevented.

According to the present implementation, in the case where the target current value of the forward clutch solenoid 50a is determined to be abnormal, the target current value is controlled at a value (for example, 0 mA) that allows the driving force of the engine 10 to be transmitted. Therefore, in the case where the target current value is determined to be abnormal, the driving force of the engine 10 may be caused to be transmitted.

According to the present implementation, in the case where the target current of the forward clutch solenoid 50a is determined to be abnormal, the vehicle is automatically braked. Therefore, it is possible to prevent the vehicle from sliding down, for example, on a slope against the intention of a driver.

According to the present implementation, a warning is issued to a driver in the case where the target current value of the forward clutch solenoid 50a is determined to be abnormal. Thus, in the case where the target current value is determined to be abnormal, it is possible to make the driver recognize the abnormality. Therefore, the driver is able to react, for example, to step on the brake.

According to the present implementation, when the accelerator pedal is depressed by a driver, determination is made as to abnormality of the target current value of the forward clutch solenoid 50a, and thus when a driver has the intention of driving, the above-described determination as to abnormality may be made.

Although the implementation of the present disclosure has been described above, the present disclosure is not limited to the above-described implementation and various modifications are possible. For example, in the above-described implementation, the target current value of the forward clutch solenoid 50a is acquired as the control variable for the forward and reverse switching mechanism 27, and determination is made as to abnormality of the target current value. However, a configuration may be adopted in which instead of the target current value of the forward clutch solenoid 50a, the actual current value of the forward clutch solenoid 50a is acquired and determination is made as to abnormality of the actual current value. That is, a configuration may be adopted in which the actual current value is determined to be abnormal in the case where D range (forward travelling range) is selected, the vehicle speed is higher than or equal to a predetermined speed (for example, 5 km/h), and the actual current value (corresponding to the actual clutch pressure) of the forward clutch solenoid 50a is such a value (for example, 900 mA or greater) that does not allow the driving force of the engine 10 to be transmitted.

In this manner, it is possible to detect whether or not the actual current value of the forward clutch solenoid 50a is an abnormal value (that is, to determine the reasonableness of the actual current value) that does not allow the driving force of the engine 10 to be transmitted against the intention of a driver, the forward clutch solenoid 50a for adjusting the clutch pressure of the forward clutch 29 included in the forward and reverse switching mechanism 27.

The above implementation has been described using an example of the case where D range (forward travelling range) is selected. Alternatively, in the case where R range (reverse travelling range) is selected, determination may be made similarly as to abnormality of the forward and reverse switching mechanism 27.

Furthermore, the above-described implementation has a configuration in which the forward clutch 29 is engaged internally in a software-controlled manner (the target current value of the forward clutch solenoid 50a is set to 0 (mA)) at the time of abnormality. Alternatively, a configuration may be adopted in which the control variable acquisition module 41 and the abnormality determination module 43 are implemented on a different CPU or supervisory IC for example, and the forward clutch 29 is engaged externally in a hardware-controlled manner (the driving current of the forward clutch solenoid 50a is stopped) at the time of abnormality.

In the above-described implementation, the forward and reverse switching mechanism 27 is disposed in a front stage of the primary pulley 34. Alternatively, a configuration may be adopted in which the forward and reverse switching mechanism 27 is disposed in a rear stage of the secondary pulley 35.

The forward clutch 29 and reverse brake 30 of hydraulic type are used in the above-described implementation. Alternatively, a forward clutch and a reverse brake of electromagnetic type for example may also be used.

The above-described implementation adopts a configuration in which the spool valve is driven by the solenoid valve. Alternatively a configuration in which the spool valve is driven by a stepping motor instead of the solenoid valve may be adopted.

In the above-described implementation, the present disclosure has been applied to a chain-type continuously variable transmission (CVT). Alternatively, the present disclosure may be applied to, for example, a belt-type CVT or a toroidal-type CVT.

The ECU 60 that controls the engine 10 and the TCU 40 that controls the continuously variable transmission 20 are each implemented by an individual hardware in the above implementation. Alternatively, the ECU 60 and the TCU 40 may be integrally implemented.

The invention claimed is:

1. An abnormality detection device for a continuously variable transmission, the abnormality detection device comprising:
   a selection unit that receives an operation of selecting a range of the continuously variable transmission;
   a vehicle speed detection unit that detects a speed of a vehicle;
   an acquisition module that acquires a control variable for controlling an operation of a forward and reverse switching mechanism that is provided between an engine and a driving wheel to switch between forward rotation and reverse rotation of the driving wheel; and
   a determination module that determines the control variable for the forward and reverse switching mechanism to be abnormal in the case where a traveling range is selected by the selection unit, a vehicle speed detected by the vehicle speed detection unit is either higher than or equal to a predetermined speed, and the control variable for the forward and reverse switching mechanism, acquired by the acquisition module, has a value that does not allow a driving force of the engine to be transmitted.

2. The abnormality detection device for a continuously variable transmission according to claim 1,
   wherein the acquisition module acquires a target current value of an actuator that adjusts a clutch pressure of a clutch included in the forward and reverse switching mechanism, the target current value serving as the control variable for the forward and reverse switching mechanism, and
   the determination module determines the target current value to be abnormal in the case where a traveling range is selected, the vehicle speed is either higher than or equal to the predetermined speed, and the target current value is a value that does not allow a driving force of the engine to be transmitted.

3. The abnormality detection device for a continuously variable transmission according to claim 1,
   wherein the acquisition module acquires an actual current value of an actuator that adjusts a clutch pressure of a clutch included in the forward and reverse switching mechanism, the actual current value serving as the control variable for the forward and reverse switching mechanism, and
   the determination module determines the actual current value to be abnormal in the case where a traveling range is selected, the vehicle speed is either higher than or equal to the predetermined speed, and the actual current value is a value that does not allow a driving force of the engine to be transmitted.

4. The abnormality detection device for a continuously variable transmission according to claim 1,
   wherein the determination module determines the control variable for the forward and reverse switching mechanism to be abnormal in the case where a state, in which the control variable for the forward and reverse switching mechanism is determined to be abnormal, continues for a predetermined time or longer.

5. The abnormality detection device for a continuously variable transmission according to claim 2,
   wherein the determination module determines the control variable for the forward and reverse switching mechanism to be abnormal in the case where a state, in which the control variable for the forward and reverse switching mechanism is determined to be abnormal, continues for a predetermined time or longer.

6. The abnormality detection device for a continuously variable transmission according to claim 3,
   wherein the determination module determines the control variable for the forward and reverse switching mechanism to be abnormal in the case where a state, in which the control variable for the forward and reverse switching mechanism is determined to be abnormal, continues for a predetermined time or longer.

7. The abnormality detection device for a continuously variable transmission according to claim 4, further comprising
   a control module that controls a driving amount of the forward and reverse switching mechanism at a value that allows a driving force of the engine to be transmitted, in the case where the control variable for the forward and reverse switching mechanism is determined to be abnormal.

8. The abnormality detection device for a continuously variable transmission according to claim 5, further comprising
a control module that controls a driving amount of the forward and reverse switching mechanism at a value that allows a driving force of the engine to be transmitted, in the case where the control variable for the forward and reverse switching mechanism is determined to be abnormal.

9. The abnormality detection device for a continuously variable transmission according to claim 5, further comprising
a control module that controls a driving amount of the forward and reverse switching mechanism at a value that allows a driving force of the engine to be transmitted, in the case where the control variable for the forward and reverse switching mechanism is determined to be abnormal.

10. The abnormality detection device for a continuously variable transmission according to claim 4, further comprising:
a braking unit that brakes the vehicle; and
a braking control unit that controls an operation of the braking unit,
wherein the braking control unit automatically brakes the vehicle in the case where the control variable for the forward and reverse switching mechanism is determined to be abnormal.

11. The abnormality detection device for a continuously variable transmission according to claim 5, further comprising:
a braking unit that brakes the vehicle; and
a braking control unit that controls an operation of the braking unit,
wherein the braking control unit automatically brakes the vehicle in the case where the control variable for the forward and reverse switching mechanism is determined to be abnormal.

12. The abnormality detection device for a continuously variable transmission according to claim 6, further comprising:
a braking unit that brakes the vehicle; and
a braking control unit that controls an operation of the braking unit,
wherein the braking control unit automatically brakes the vehicle in the case where the control variable for the forward and reverse switching mechanism is determined to be abnormal.

13. The abnormality detection device for a continuously variable transmission according to claim 4, further comprising
a warning unit that issues a warning to a driver in the case where the control variable for the forward and reverse switching mechanism is determined to be abnormal.

14. The abnormality detection device for a continuously variable transmission according to claim 5, further comprising
a warning unit that issues a warning to a driver in the case where the control variable for the forward and reverse switching mechanism is determined to be abnormal.

15. The abnormality detection device for a continuously variable transmission according to claim 6, further comprising
a warning unit that issues a warning to a driver in the case where the control variable for the forward and reverse switching mechanism is determined to be abnormal.

16. The abnormality detection device for a continuously variable transmission according to claim 1,
wherein the determination module makes determination as to abnormality of the control variable for the forward and reverse switching mechanism when an accelerator is operated by a driver.

17. The abnormality detection device for a continuously variable transmission according to claim 2,
wherein the determination module makes determination as to abnormality of the control variable for the forward and reverse switching mechanism when an accelerator is operated by a driver.

18. The abnormality detection device for a continuously variable transmission according to claim 3,
wherein the determination module makes determination as to abnormality of the control variable for the forward and reverse switching mechanism when an accelerator is operated by a driver.

19. A method of detecting abnormality of a continuously variable transmission, the method comprising:
receiving an operation of selecting a range of the continuously variable transmission;
detecting a speed of a vehicle;
acquiring a control variable for controlling an operation of a forward and reverse switching mechanism which is provided between an engine and a driving wheel to switch between forward rotation and reverse rotation of the driving wheel; and
determining the control variable for the forward and reverse switching mechanism to be abnormal in the case where a traveling range is selected by the selecting, a vehicle speed detected by the vehicle speed detecting is either higher than or equal to a predetermined speed, and the control variable for the forward and reverse switching mechanism, acquired by the acquiring, has a value that does not allow a driving force of the engine to be transmitted.

* * * * *